Patented Feb. 20, 1923.

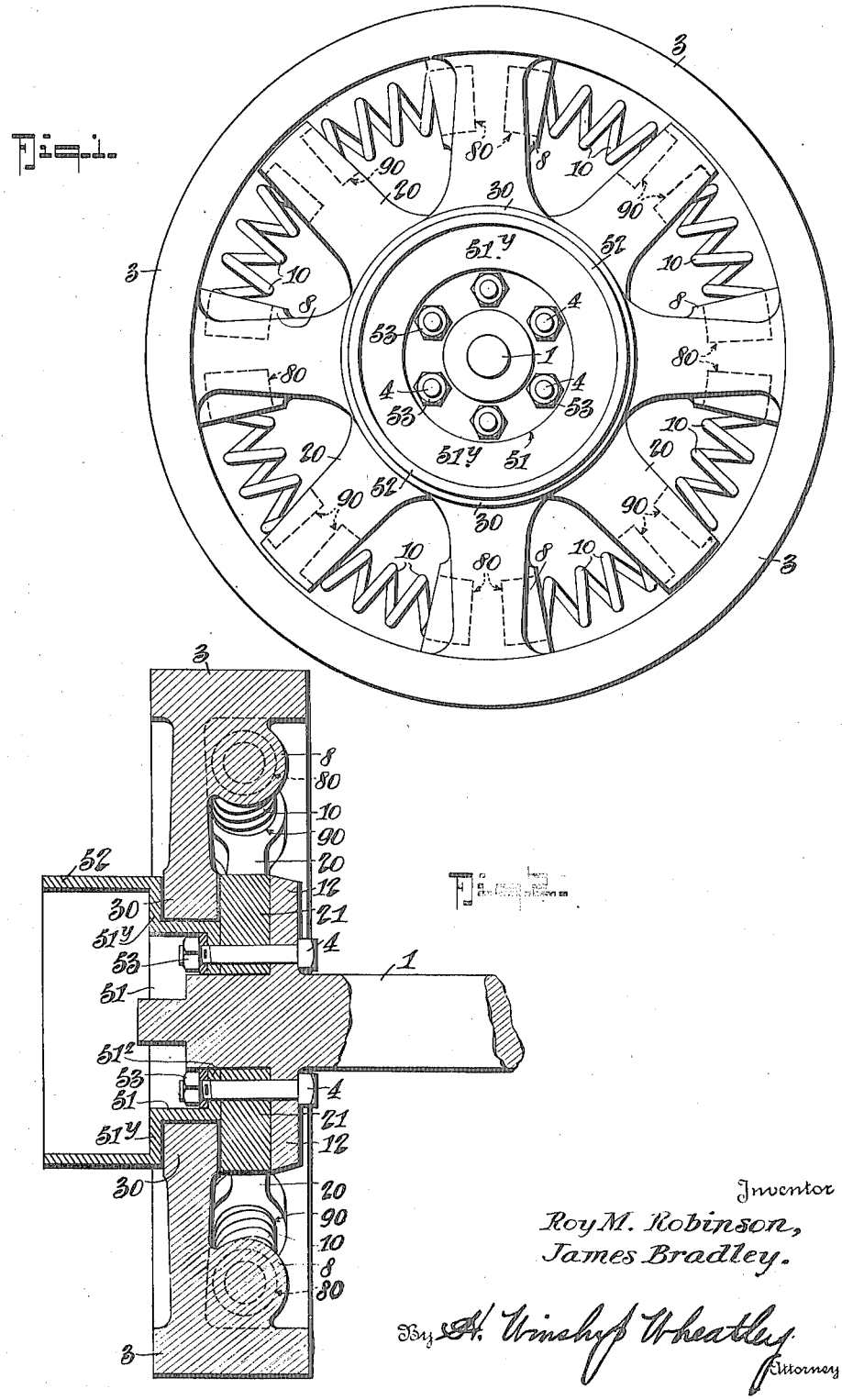

1,445,716

UNITED STATES PATENT OFFICE.

ROY M. ROBINSON AND JAMES BRADLEY, OF ALBANY, NEW YORK, ASSIGNORS OF ONE-FOURTH TO JOHN L. MALLETT AND ONE-FOURTH TO HARRY WALTER LEE, BOTH OF ALBANY, NEW YORK.

FLYWHEEL GOVERNOR.

Original application filed March 9, 1921, Serial No. 450,985. Divided and this application filed January 27, 1922. Serial No. 532,285.

*To all whom it may concern:*

Be it known that we, ROY M. ROBINSON and JAMES BRADLEY, citizens of the United States, residing at Albany, in the county of Albany and State of New York, have invented a new and Improved Flywheel Governor, of which the following is a specification.

This invention has for its purpose to provide a new and improved rotative member which, when used in connection with automotive vehicles, takes the place of the usual fly wheel on the rear end of the crank or power shaft and constitutes a flexible connection between the engine and its power application, like a transmission on a motor car power unit.

Another and essential feature of this invention is the provision of a fly wheel governor adapted for delivering or transmitting power to machinery in factories, in such manner whereby, as in starting individual machines from a power line of shafting, the said rotative or fly wheel governor provides a flexible means for taking up the load and imparting transmission without jerk or slipping of belts or placing excessive strain on the same.

As is well known, motor cars possess, more or less, erratic clutch engagement, also vibration periods during rotation of the crank shaft, which are caused by uneven pulsations, due to the difference in power impulses of the several cylinders of the motor, which vibrations have not as yet, so far as we know, been satisfactorily overcome.

This invention, among other purposes, is designed to eliminate the disadvantages mentioned and it embodies a simple, relatively economical construction of parts that present a practical means, useful as a pulley for transmission of power, for providing an efficient flexible coupling between a direct connected engine or motor and electric dynamo or generator, or in connection with an aeroplane propeller and its driving power, to take up the unequal thrusts of the blades as well as vibration.

With other minor objects in view, hereinafter apparent, this invention is a combined fly wheel governor and vibration compensator, that embodies the peculiar features of construction and novel combination of parts fully explained in the following detailed description, as specifically stated in the appended claims and illustrated in the accompanying drawing, in which:

Figure 1 is a face view.

Figure 2 is a central vertical section thereof.

In the embodiment of our invention illustrated in the accompanying drawing, the parts are especially designed for connection with the wheel 3 when it is intended to be used as a floating balance wheel to absorb vibration and balance the impulses of an internal combustion engine.

In this form of the invention, 1 is the engine shaft which is provided with a flange 12 having suitable holes through which bolts 4 pass, the bolts 4 lying parallel with the axis of the shaft 1. The bolts 4 also pass through the hub 21 of a spider, the arms 20 of which are preferably pocketed, as at 90, to receive the ends of coil springs 10 which also seat in corresponding pockets 80 in the lugs 8 of the fly wheel 3, the fly wheel 3 having a hub 30 adapted to turn on the hub 51 of the clutch member 52, the hub 51 being of a diameter less than that of the clutch member 52 and connected to it by a web $51^y$ between which web and the hub 21 of the spider, the hub 30 of the fly wheel is movably fitted. The clutch member 52 is also provided with a flange $51^z$ through which the bolts 4 pass and the bolts 4 are provided with nuts 53 by means of which the parts 12, 21 and $51^z$ may be securely clamped together to move as one with the shaft 1.

In the form of our invention illustrated in this application, it will be seen the wheel 3 is floatably mounted on the hub portion 51 and, in the practical arrangement, the said wheel and the driving spider are flexibly connected by suitable cushioning means, as for example the springs 10, so that the balance wheel 3 absorbs and balances the impulses imparted to the shaft 1.

The present application is a divisional part of our original application filed March 9, 1921, Serial No. 450,985.

What we claim is:

1. In mechanism of the character described, a power shaft, a clutch housing adapted to be clutch connected with a shaft to be driven, a balance wheel floatably mounted on the clutch housing, a spider frame, means for securing the spider frame and the clutch housing to rotate with the power shaft, and flexible connections interposed between the floatably mounted wheel and the spider frame whereby said wheel will absorb vibrations and shocks imparted to the driven shaft from the power shaft.

2. In mechanism of the character described, a power shaft having a flange, a clutch housing having a reduced hub portion and a web apertured to fit on the power shaft, a spider frame including a hub apertured to fit on the power shaft, means for securing said spider frame hub and said clutch housing web together to said power shaft flange to rotate as a unit, a fly wheel having a hub adapted to fit movably on said clutch housing hub and held between said clutch housing and said spider frame hub, and flexible connections between said fly wheel and said spider frame for absorbing shocks.

ROY M. ROBINSON.
JAMES BRADLEY.